United States Patent
Osborne et al.

(10) Patent No.: US 10,476,279 B2
(45) Date of Patent: Nov. 12, 2019

(54) FAILURE AVOIDANCE FOR BATTERY PACKS HAVING OVERCHARGE PROTECTION CIRCUITS

(71) Applicant: BLACK & DECKER INC., New Britain, CT (US)

(72) Inventors: Nathan Osborne, Baltimore, MD (US); Nicholas J. Garibaldi, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 85 days.

(21) Appl. No.: 15/403,327

(22) Filed: Jan. 11, 2017

(65) Prior Publication Data

US 2018/0198293 A1  Jul. 12, 2018

(51) Int. Cl.
| | | |
|---|---|---|
| H02J 7/00 | (2006.01) | |
| H01M 10/42 | (2006.01) | |
| H01M 10/44 | (2006.01) | |
| H01M 10/48 | (2006.01) | |
| H01M 10/0525 | (2010.01) | |

(52) U.S. Cl.
CPC .......... *H02J 7/0021* (2013.01); *H01M 10/425* (2013.01); *H01M 10/441* (2013.01); *H01M 10/482* (2013.01); *H02J 7/0026* (2013.01); *H02J 7/0029* (2013.01); *H02J 7/0045* (2013.01); *H02J 7/0068* (2013.01); *H01M 2200/106* (2013.01); *H01M 2220/30* (2013.01); *H02J 2007/0037* (2013.01)

(58) Field of Classification Search
CPC ...... H02J 7/0021; H02J 7/0026; H02J 7/0068; H02J 7/0016; H01M 10/0525; H01M 10/425; H01M 10/441; H01M 10/482; H01M 2010/4271; H01M 2220/30; Y02E 60/12; G01R 31/3658; Y02T 10/7055
USPC ....................................................... 320/116
See application file for complete search history.

(56) References Cited

U.S. PATENT DOCUMENTS

| | | | | |
|---|---|---|---|---|
| 5,150,033 | A * | 9/1992 | Conway ................ | H02J 7/0029 320/112 |
| 6,166,516 | A * | 12/2000 | Albright ............... | H02J 7/0054 320/104 |
| 2004/0101744 | A1* | 5/2004 | Suzuki ................ | H01M 2/1016 429/61 |
| 2008/0238370 | A1* | 10/2008 | Carrier ................ | H01M 2/1022 320/134 |
| 2011/0148361 | A1* | 6/2011 | Yokotani ............. | H01M 10/482 320/136 |

(Continued)

*Primary Examiner* — Richard Isla
*Assistant Examiner* — Mohammed J Sharief
(74) *Attorney, Agent, or Firm* — Harness, Dickey & Pierce, PLC (57) ABSTRACT

A battery pack is provided for use with a power tool. The battery pack includes a housing and a plurality of battery cells connected in series within the housing, such that an inter-cell node is defined between each pair of adjacent battery cells. A plurality of terminals is at least partially exposed outside of the housing for coupling the battery cells to at least one of a power tool or a battery charger. The plurality of terminals include a positive terminal, a negative terminal and one or more inter-cell terminals, where at least one of the inter-cell terminals is electrically coupled via a positive temperature coefficient thermistor to one of the inter-cell nodes.

14 Claims, 8 Drawing Sheets

(56) References Cited

U.S. PATENT DOCUMENTS

2011/0248669 A1* 10/2011 Cunanan .................. B25F 5/021
    320/106
2017/0222454 A1* 8/2017 Bakker .................. H02J 7/0013

* cited by examiner

FAILURE AVOIDANCE FOR BATTERY PACKS HAVING OVERCHARGE PROTECTION CIRCUITS

FIELD

The present disclosure relates to battery packs having protective circuits and methods for assembling the same.

BACKGROUND

Cordless products or devices which use rechargeable batteries are prevalent in the marketplace. Rechargeable batteries may be used in numerous devices ranging from computers to power tools. Since the devices use a plurality of battery cells, the battery cells are commonly packaged in a battery pack. The battery pack may in turn be used to power the devices when coupled thereto. Once depleted, the battery pack may be recharged using a battery charger.

Generally speaking, lithium-ion (Li-ion) batteries have supplanted nickel-cadmium (NiCd), nickel-metal-hydride (NiMH), and lead-acid batteries in low-voltage electronic devices such as personal computers and cordless power tools. As compared to these conventional cell chemistries, Li-ion batteries are lighter and exhibit a larger capacity per unit volume. For this reason, Li-ion batteries are suitable for portable devices that are preferably light and intended for continuous use over a long time period.

Li-ion batteries, however, deteriorate rapidly when subjected to adverse operating conditions, such overcharging, over-discharging, or overheating. Accordingly, lithium-ion batteries typically include functionality to protect against such fault conditions. To facilitate testing of these protection functions during the assembly process, ancillary circuitry may be introduced into Li-ion battery packs. It is imperative that the protective functions and any ancillary circuitry operate properly. To this end, the ability to test these protective functions prior to placing the battery packs with a user is desirable. Also, the ability to prevent damaging the battery cells due to short circuits across battery pack terminals is desirable.

This section provides background information related to the present disclosure which is not necessarily prior art.

SUMMARY

This section provides a general summary of the disclosure, and is not a comprehensive disclosure of its full scope or all of its features.

A battery pack is provided for use with a power tool. The battery pack includes a housing and a plurality of battery cells connected in series within the housing, such that an inter-cell node is defined between each pair of adjacent battery cells. A plurality of terminals is at least partially exposed outside of the housing for coupling the battery cells to at least one of a power tool or a battery charger. The plurality of terminals include a positive terminal, a negative terminal and one or more inter-cell terminals, where at least one of the inter-cell terminals is electrically coupled individually via a positive temperature coefficient thermistor to a corresponding inter-cell node.

The battery pack further includes a protection circuit configured to measure voltage across each of the battery cells during a charging operation and operates to discontinue the charging operation when voltage across a given cell exceeds a threshold. The protection circuit includes a plurality of inputs for measuring cell voltage. Each input to the protection circuit is also electrically coupled via the corresponding positive temperature coefficient thermistor to one of the inter-cell nodes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
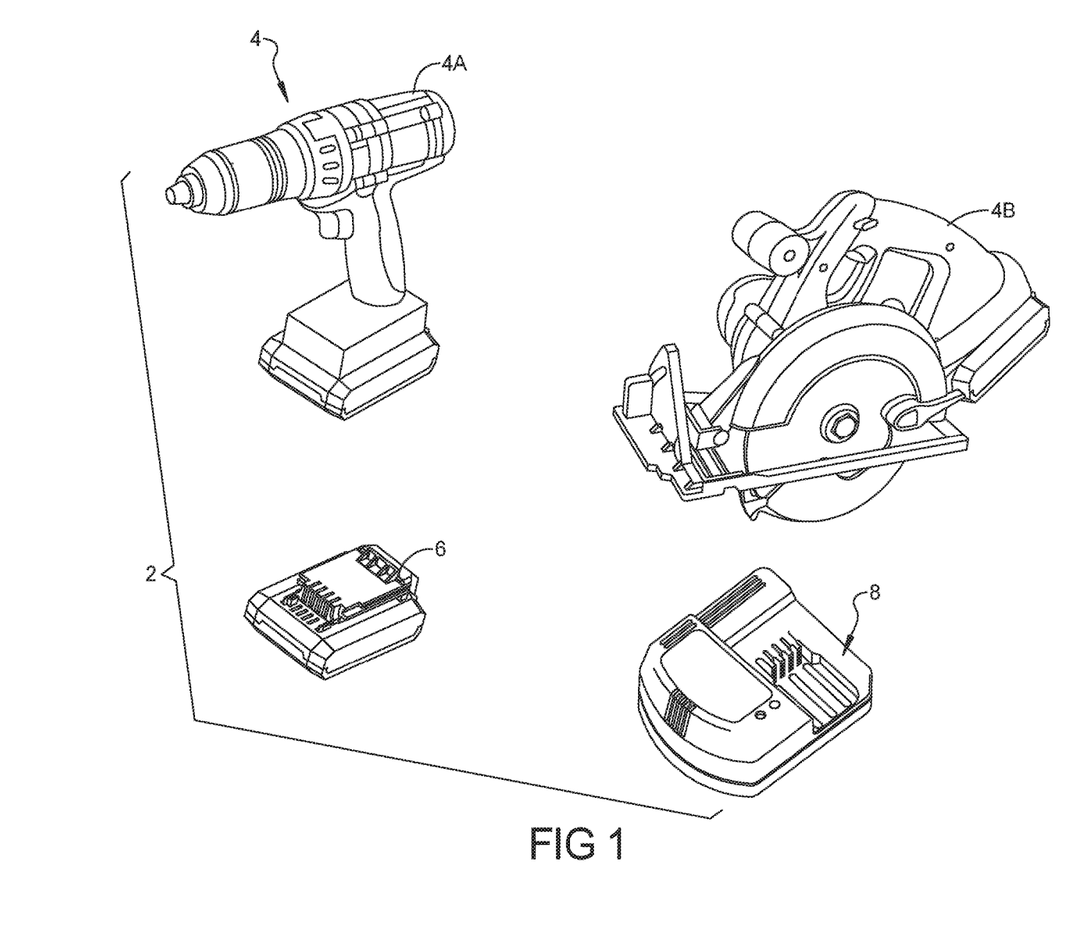
FIG. 1 is a diagram of a system of power tools.

The present disclosure can relate to a system of power tools of the type that is generally indicated by reference numeral 2 in FIG. 1. The system of power tools 2 can include, for example, one or more power tools 4, a battery pack 6 and a battery pack charger 8. Each of the power tools 4 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 2 includes a first power tool 4A and a second power tool 4B. For example, the first power tool 4A can be a drill/driver similar to that which is described in U.S. Pat. No. 6,431,289, while the second power tool 4B can be a circular saw similar to that which is described in U.S. Pat. No. 6,996,909. The battery pack 6 can be removably coupled to the first and second power tools 4A and 4B to provide electrical power thereto. It is noteworthy that the broader aspects of this disclosure are applicable to other types of battery powered devices.

FIGS. 2-7 depict an example embodiment of the battery pack 6. In the example embodiment, the housing assembly 12 for the battery pack 6 may include a top housing 20 and a bottom housing 22. The top and bottom housings 20, 22 may be molded and/or otherwise formed from a polymeric material, for example. The top and bottom housings 20, 22 may be joined together by a snap-fit, press-fit, one or more fasteners and/or any other suitable joining method. The top and bottom housings 20, 22 may cooperate to substantially enclose the battery cells 14, cell holder 16 and board 18.

Figure 4:
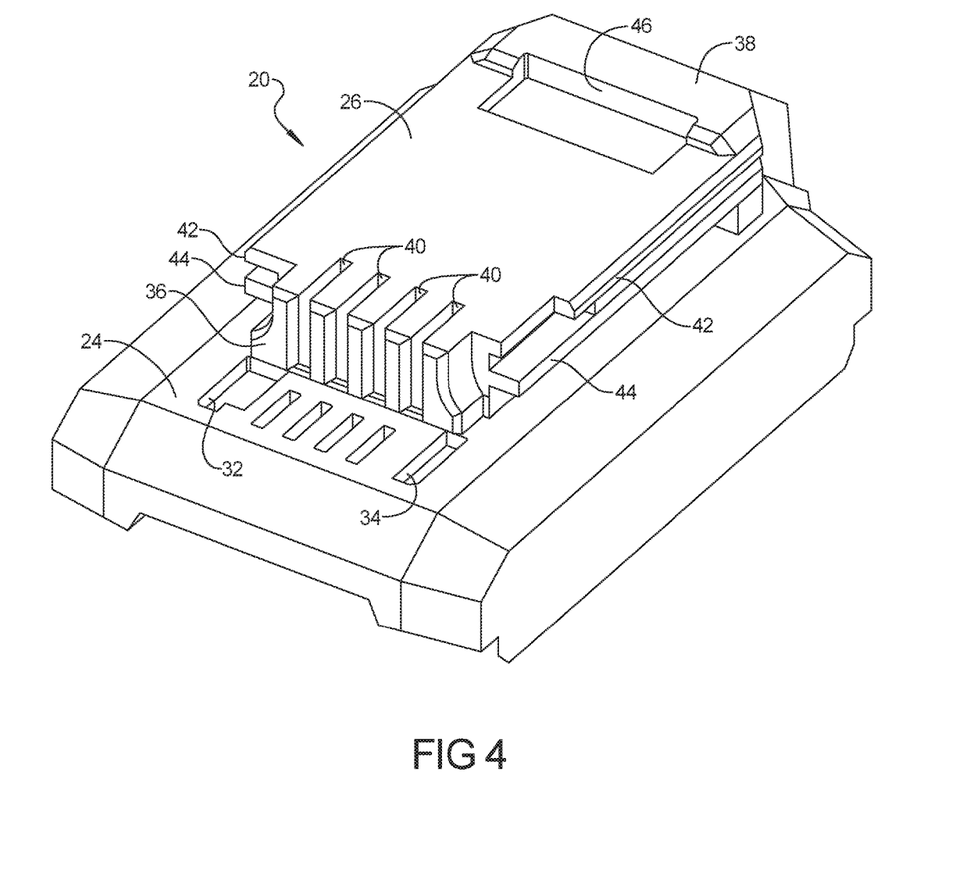
FIG. 4 is a perspective view of a portion of a housing of the battery pack.

The top housing 20 may include a base portion 24 and an upper portion 26 that slidably engage a power tool or a battery charger. The base portion 24 may include first and second ends 28, 30 and first and second apertures 32, 34 disposed proximate the first end 28. The upper portion 26 may extend from the base portion 24 and may include first and second ends 36, 38. The first and second apertures 32, 34 may be disposed between the first end 28 of the base portion 24 and the first end 36 of the upper portion 26. The first end 36 of the upper portion 26 may include a plurality of terminal slots 40. The upper portion 26 may also include a first pair of guide rails 42 and a second pair of guide rails 44. The second pair of guide rails form a slot 45 with the base portion 24. Corresponding guide rails (not shown) of the power tool and battery charger may slidably engage the slots 45 to align and couple the battery pack 10 to the power tool or charger.

The second end 38 of the upper portion 26 may be generally aligned with the second end 30 of the base portion 24 and may include an opening 46 through which a latch 48 extends. The latch 48 may be a part of a release mechanism for fixing and releasing the battery pack 10 to/from engagement with the power tool or battery charger.

Figure 5:
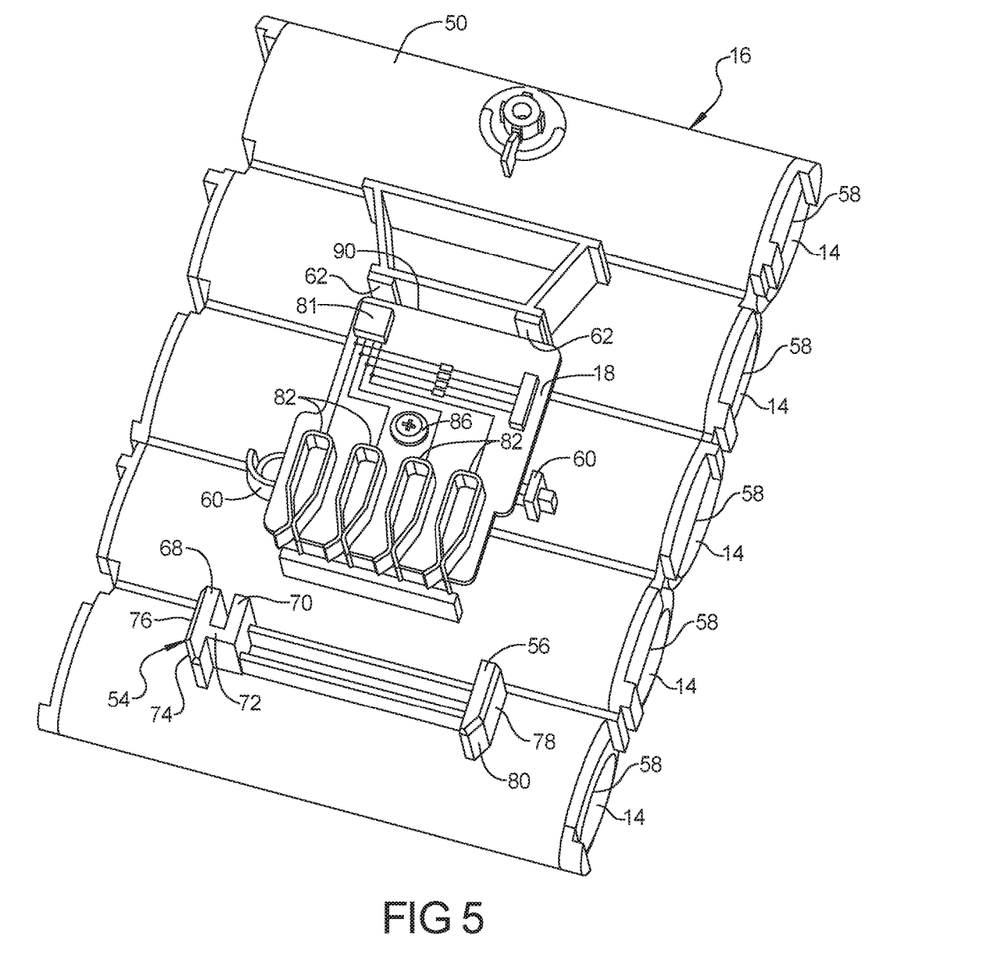
FIG. 5 is a perspective view of a cell holder of the battery pack having a board mounted thereto.
Figure 6:
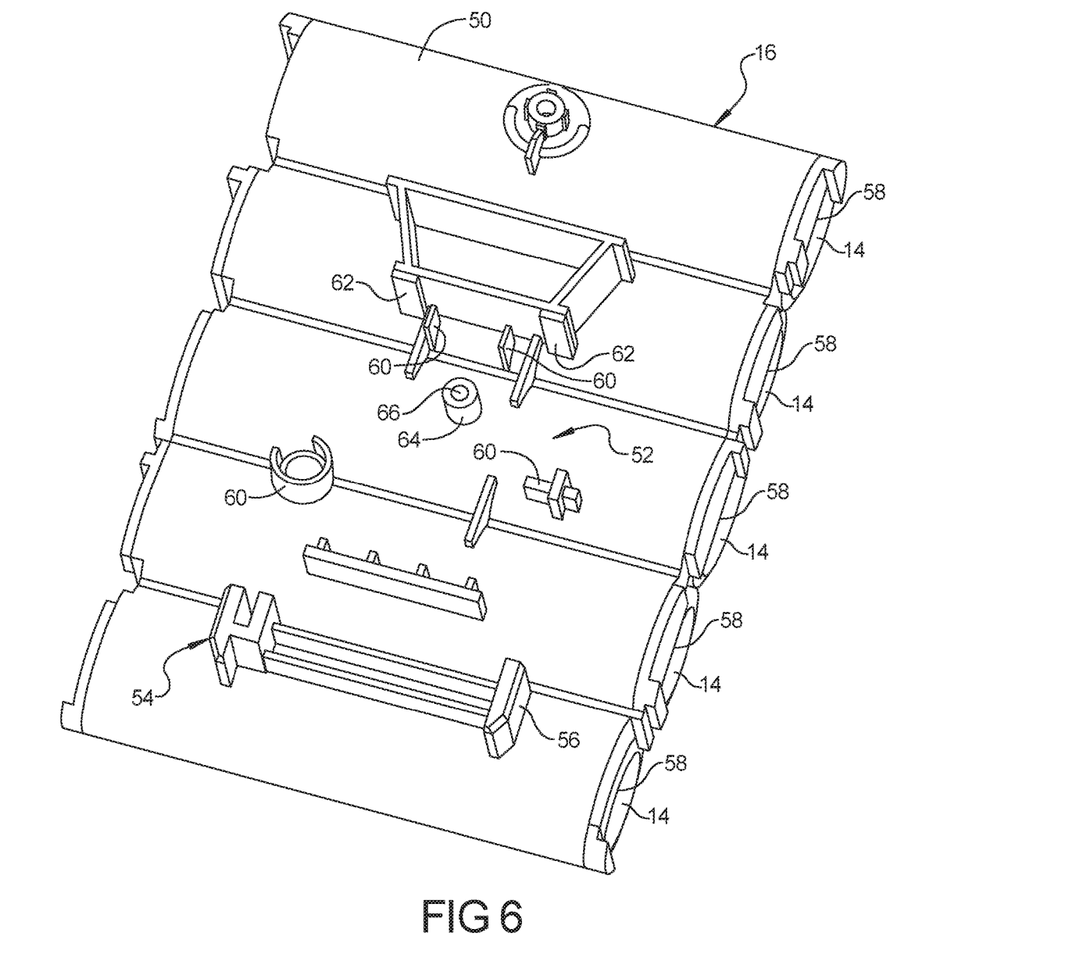
FIG. 6 is a perspective view of the cell holder of FIG. 5.

Referring to FIGS. 5 and 6, the battery cells 14 may be supported by a cell holder 16 disposed in the bottom housing 22. The battery cells 14 may include one or more of a lithium ion (Li-ion), nickel cadmium (NiCd), nickel metal hydride (NiMH) and/or lead-acid battery cells, for example, and/or any other type of battery cell. The battery cells 14 may be connected in series and/or parallel to each other and to the board 18. It will be appreciated that the battery pack 10 could include any number of battery cells 14.

Figure 7:
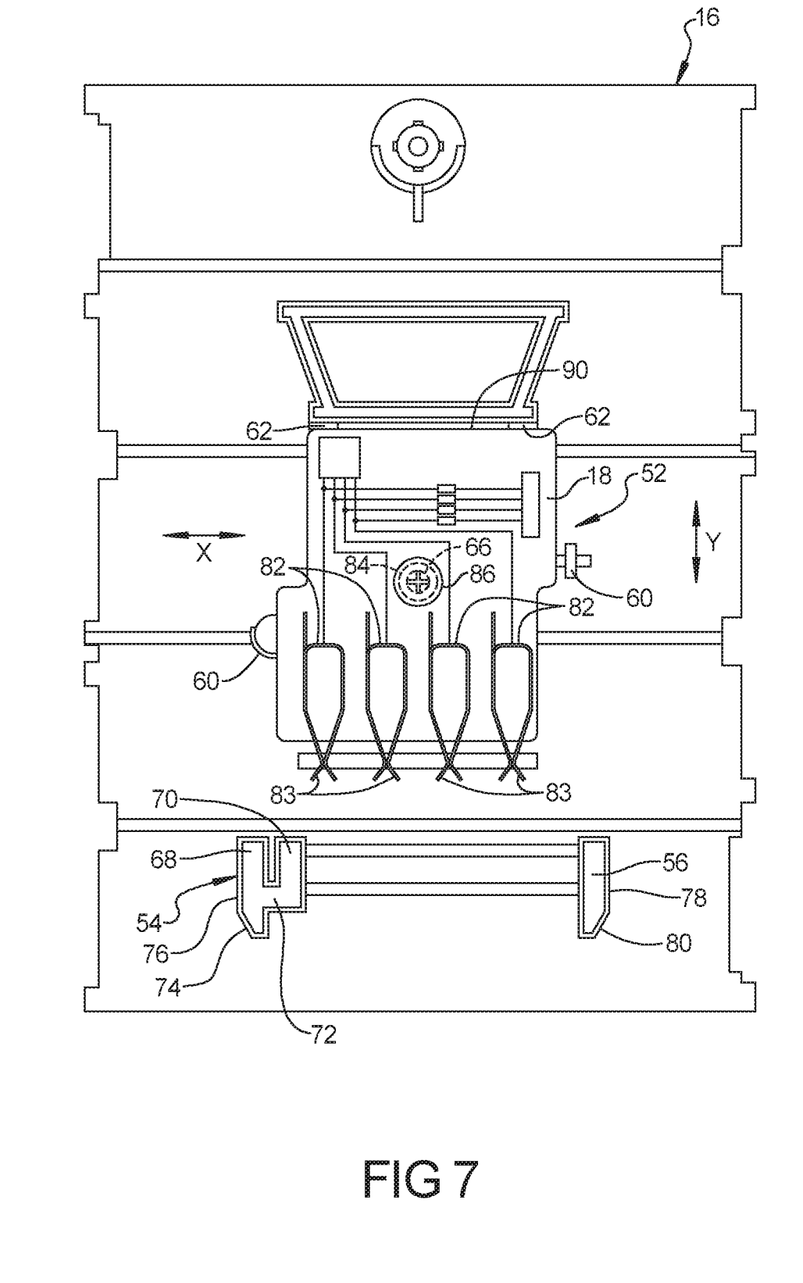
FIG. 7 is a plan view of the cell holder and board with an alignment fixture engaging guide members and terminal contacts of the cell holder and board, respectively.

Turning to FIGS. 5-7, the cell holder 16 may be molded or otherwise formed from a polymeric material, for example, and may include a body 50, a mounting interface 52, a first guide member 54 and a second guide member 56. The body 50, mounting interface 52 and first and second guide members 54, 56 may be integrally formed as part of the cell holder 16. The body 50 may include a plurality of contoured recesses 58 in which corresponding battery cells 14 may be nested (as shown in FIG. 5). The battery cells 14 could be fixed to the cell holder 16 by snap fit, fasteners and/or any other suitable attachment device or method. The cells may be electrically coupled to each other by metal straps (not shown). The body 50 of the cell holder 16 may be fixedly attached to the top and/or bottom housings 20, 22 (FIG. 2) by a snap or press fit, one or more fasteners and/or any other attachment device or method.

The mounting interface 52 may support the board 18 (e.g., a printed circuit board) within the housing assembly 12. In the example embodiment, the interface 52 may include a plurality of bosses 60 and one or more stops 62 (shown best in FIG. 5). The bosses 60 may extend upward from the body 50 toward the top housing 20 and define a first plane above the body 50 upon which the board 18 is disposed. In some embodiments, the bosses 60 could be integrated into a single unitary feature or surface. The stops 62 may define a second plane against which the board 18 may be disposed. The second plane may be perpendicular to the first plane. The mounting interface 52 may also include an engagement feature, which in the particular example provided, is embodied as a boss 64 having a threaded aperture 66 (shown in FIG. 6).

Figure 2:
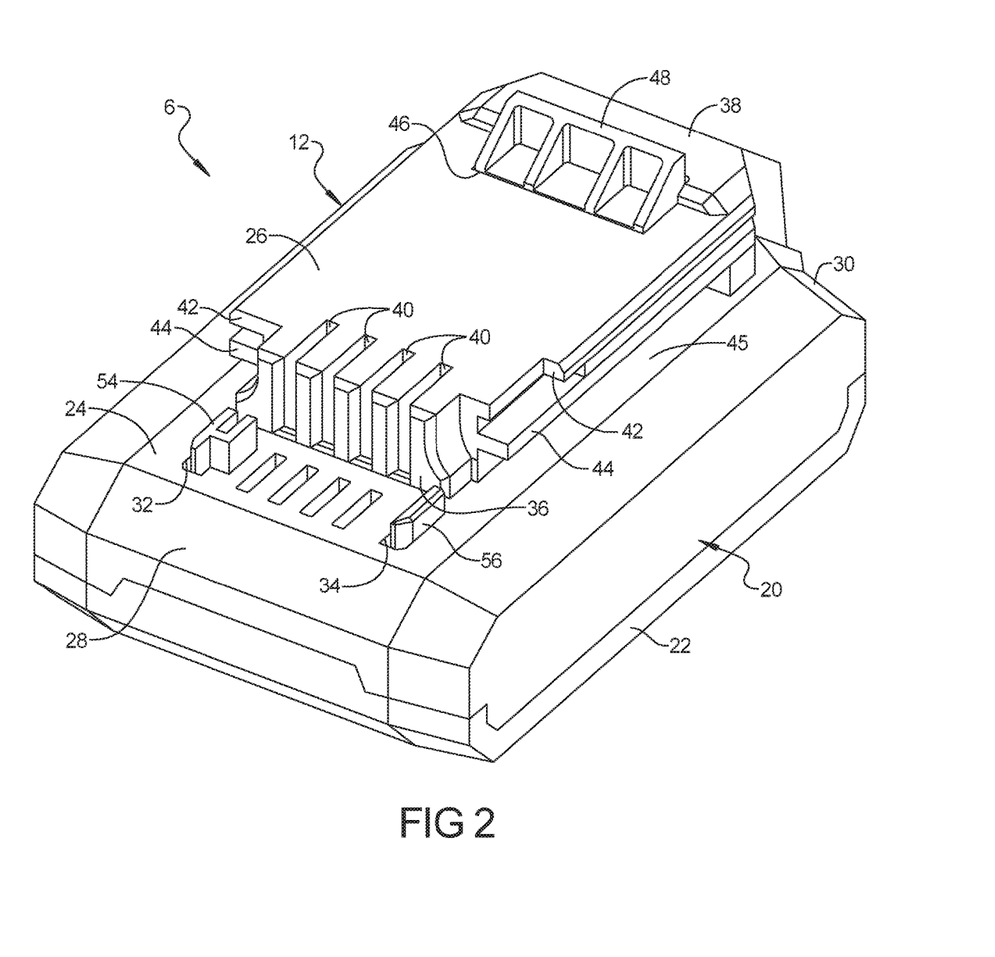
FIG. 2 is a perspective view of an example battery pack.
Figure 3:
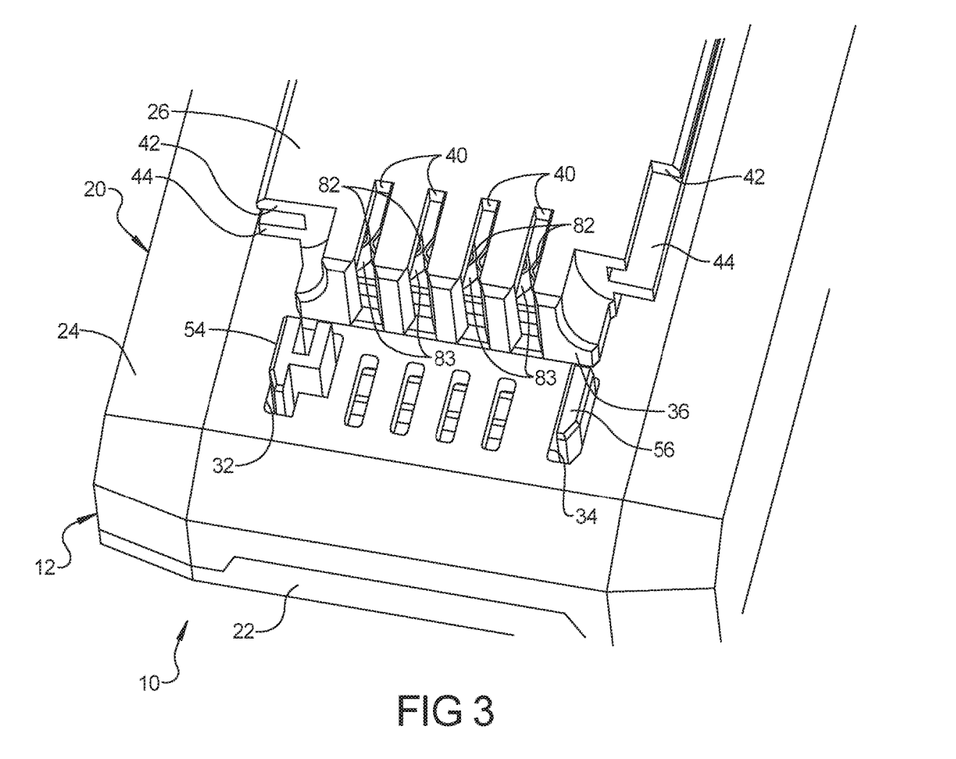
FIG. 3 is a partial perspective view of the battery pack of FIG. 1.

The first and second guide members 54, 56 may extend upward from the body 50 and may protrude through the first and second apertures 32, 34, respectively, of the top housing 20 when the battery pack 10 is in a fully assembled state (as shown in FIGS. 2 and 3). The first guide member 54 may include a first leg 68, a second leg 70 and a cross-member 72. The first and second legs 68, 70 may be substantially parallel to each other and may be connected to each other by the cross-member 72. The first leg 68 may include a planar outer side 76. The first leg 68 may be longer than the second leg 70 and may include a chamfered portion 74. The second leg 70 and/or the cross-member 72 may be provided to restrict or prevent the battery pack 10 from being engaged with a tool or charger that is incompatible with the battery pack 10. That is, a tool or charger that is intended to operate with a battery pack of a different voltage, type and/or configuration may include structure that would interfere with the second leg 70 and/or cross-member 72 to prevent engagement therewith. It will be appreciated from the present disclosure that the first guide member 54 could include any other suitable shape and/or configuration.

The second guide member 56 may be substantially parallel to the first and second legs 68, 70 of the first guide member 54. The second guide member 56 may include a planar outer side 78 and a chamfered portion 80. The planar outer side 78 of the second guide member 56 may be parallel to the planar outer side 76 of the first guide member 54. It will be appreciated from the present disclosure that the second guide member 56 could include any other suitable shape and/or configuration.

Circuit board 18 includes a plurality of terminal contacts 82 soldered thereon or otherwise attached thereto. The plurality of terminals are at least partially exposed to the outside of the housing and configured to electrically couple the battery cells to at least one of a power tool or a battery charger. In the particular example provided, the terminal contacts 82 are female tulip clips adapted to receive corresponding male blade terminals (not shown) of the power tool and battery charger. It will be appreciated that the terminal contacts 82 could include any type of male or female contacts. Flared openings 83 of the terminal contacts 82 may face toward the first end 36 of the top housing 20 such that when the battery pack 10 is in the fully assembled state, the openings 83 of each of the terminal contacts 82 are aligned with a corresponding one of the terminal slots 40 so that male blade terminals of the power tool or battery charger can be received through the terminal slots 40 and openings 83 and engage the terminal contacts 82 when the battery pack 10 is fully engaged with the power tool or battery charger. In the particular example provided, the entire first and second guide members 54, 56 may be disposed between the terminal contacts 82 and the first end 28 of the base portion 24 of the top housing 20.

The circuit board 18 may further support other electrical components. For example, one or more integrated chips 81 may be mounted to the board 18. Other types of electrical components include but are not limited to positive temperature coefficient (PTC) thermistors, resistors, capacitors, transistors, diodes and thermistors.

In the example embodiment, the board 18 also includes an aperture 84 through which a threaded fastener 86 may extend to threadably engage the threaded aperture 66 in the cell holder 16. The aperture 84 may include a larger diameter than the threaded aperture 66 to enable the board 18 to move laterally relative to the cell holder 16 in a direction X and/or a direction Y (shown in FIG. 7) while the fastener 86 is engaged with the apertures 66, 84, but before the fastener 86 is tightened down against the board 18. While the aperture 84 is shown in FIG. 6 as a circular hole, in some embodiments, the aperture 84 may include a slot that is elongated in the direction X. A back edge 90 of the board 18 may abut the stops 62 of the mounting interface 52 of the cell holder 16. It will be appreciated that in some embodiments, the fastener 86 may be a self-tapping screw. In such embodiments, the boss 64 may be initially formed without the threaded aperture 66 (or initially formed with only a pilot hole), and the fastener 86 may be driven into the boss 64. While a particular battery pack has been described above, it is readily understood that the broader aspects of this disclosure are applicable battery packs having different constructs.

Figure 8:
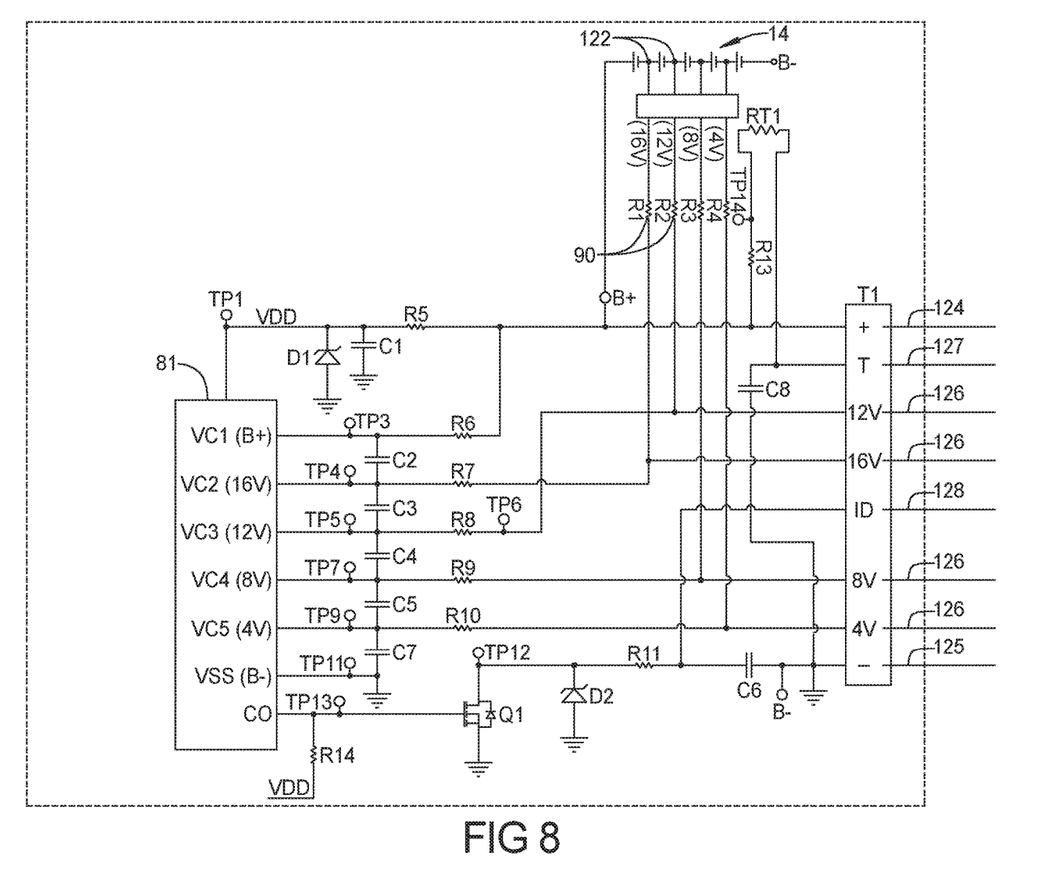
FIG. 8 is a schematic of the example battery pack.

FIG. 8 is a schematic of the example battery pack 6. The plurality of battery cells 14 are connected in series and have an inter-cell node 122 defined between each pair of adjacent battery cells. The terminals 82 include a pack positive terminal 124, a pack negative terminal 125 and one or more inter-cell terminals (cell taps) 126, where each inter-cell terminal 126 is electrically coupled to one of the inter-cell nodes 122. The plurality of terminals 82 may also include other terminals, such as a temperature terminal (T) 127 electrically coupled to a thermistor RT1 and an identification/communication terminal (ID) 128 electrically coupled to the protective circuit 81 and a switch Q1. More or less terminals are contemplated by this disclosure.

Protective circuits are commonly included in battery packs, especially those having lithium-ion battery cells. In the example embodiment, the protective circuit 81 is configured to measure voltage across each of the battery cells 14 during a charging operation. To do so, the protective circuit 81 has inputs for measuring cell voltage across each battery cell 14, such that each input is electrically coupled to one of the inter-cell nodes 122. When voltage across any given cell exceeds a predefined threshold, the protective circuit 81 sends a signal to the charger to discontinue the charging operation. In the example embodiment, the switch Q1 is electrically coupled between the protective circuit 81 and the ID terminal 128. When the voltage across a given cell exceeds a predefined threshold, the protective circuit 81 sends a signal to the switch Q1 to open the switch. Opening the switch Q1 sends a flag signal (for example, a high signal) to the charger through the ID terminal 128. The charger receives this flag (high) signal as a stop charging signal and stops the charging process. The protective circuit 81 may be implemented, for example by an integrated circuit commercially available from Seiko Epson. Protective circuits which perform this as well as other types of function also fall within the scope of this disclosure.

In one aspect of this disclosure, it may be desirable to verify the functionality of the protective circuit 81 during pack assembly and prior to shipment of the product to the customer. During verification, a test voltage (which is greater than the predefined threshold) may be selectively applied to the inter-cell terminals 126. This test voltage should cause the protective circuit 81 to think there is an overvoltage situation and open the switch Q1. To prevent unnecessary and/or damaging charging of the battery cells during the verification process, a resistive element is interposed between each inter-cell node 122 and corresponding inter-cell terminal 126. More specifically, a positive temperature coefficient thermistor (PTCs) 90 is interposed between each inter-cell node 122 and the corresponding inter-cell terminal 126. During the testing process, the test voltage is not seen (or minimally seen) at the cells due to the PTCs.

In addition, if a short occurs across two or more inter-cell terminals 126 during charging or discharging or even when the battery pack is not coupled to a power tool or a battery charger, the cells would experience an inrush or a spike of current, potentially damaging the cells. By placing the PTCs 90 between the inter-cell node 122 and the inter-cell terminal 126, if a short occurs, the PTCs 90 will experience self-heating which in turn increases their resistance. The increased resistance inhibits increased current flow from the short and thereby prevents damage to the battery. Once the short circuit has been removed, the PTCs 90 return to their nominal resistance (e.g., on the order of 1 Ohm to 20 Ohms and more particularly 10 Ohms) and the battery functions properly. In this way, PTCs 90 serve to prevent certain failure conditions from occurring in the battery pack.

In one embodiment, the PTCs are wave soldered to the circuit board. In addition to one or more PTCs, numerous other components may be mounted to the circuit board which is included in the battery pack. For example, the terminal contacts 82 are wave soldered to the board. Other electrical components, such as the integrated circuit 81 embodying protective functions, may be mounted to the circuit board in a similar manner to the PTC. Alternatively, these other electrical components may be mounted to the circuit board using other techniques, such as reflow soldering. In addition, these other electrical components may be mounted before or after the wave soldering process.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A battery pack for use with a power tool, comprising:
   a housing;
   a plurality of battery cells connected in series within the housing and having an inter-cell node defined between each pair of adjacent battery cells in the plurality of battery cells;
   a plurality of terminals at least partially exposed to an outside of the housing and configured to electrically couple the battery cells to at least one of the power tool or a battery charger, where the plurality of terminals include a positive terminal, a negative terminal and one or more inter-cell terminals, where at least one of the inter-cell terminals is electrically coupled via a positive temperature coefficient thermistor to one of the inter-cell nodes; and
   a protection circuit configured to measure voltage across each of the battery cells during a charging operation and operates to discontinue the charging operation when voltage across a given cell exceeds a threshold.

2. The battery pack of claim 1 wherein each inter-cell node is electrically coupled individually via the positive temperature coefficient thermistor to a corresponding inter-cell terminal.

3. The battery pack of claim 2 wherein the protection circuit having a plurality of inputs for measuring cell voltage, each input of the plurality of inputs is electrically connected individually to a corresponding inter-cell terminal.

4. The battery pack of claim 1 wherein each inter-cell terminal is electrically connected individually by a circuit path to a corresponding one of the inter-cell nodes and each circuit path is electrically connected individually to the protection circuit, such that the positive temperature coefficient thermistor is disposed between the inter-cell terminal and the inter-cell node in each circuit path.

5. The battery pack of claim 1 further comprises a circuit board residing in the housing, where the positive temperature coefficient thermistors and the protection circuit are mounted to the circuit board.

6. The battery pack of claim 1 further comprises a switch electrically connected between the protection circuit and one of the plurality of terminals, wherein the protection circuit opens the switch when voltage across a given cell exceeds the threshold.

7. The battery pack of claim 1 wherein the plurality of battery cells having a lithium-ion chemistry.

8. The battery pack of claim 1 wherein the positive temperature coefficient thermistors having a nominal resistance on the order of ten Ohms.

9. A battery pack for use with a power tool, comprising:
   a housing;
   a plurality of battery cells connected in series within the housing, such that an inter-cell node is defined between each pair of adjacent battery cells in the plurality of battery cells;
   a plurality of terminals configured to electrically couple the battery cells to the power tool and at least partially exposed to an outside of the housing, where the plurality of terminals include a positive terminal, a negative terminal and one or more inter-cell terminals; and
   a protection circuit configured in the housing to measure voltage across each of the battery cells during a charging operation and operates to discontinue the charging operation when the voltage across a given cell exceeds a threshold, wherein each inter-cell terminal is electrically connected individually by a circuit path to a corresponding one of the inter-cell nodes and each circuit path is electrically connected individually to the protection circuit, such that a thermistor is disposed in each circuit path between the inter-cell terminal and the inter-cell node.

10. The battery pack of claim 9 wherein the thermistor is further defined as a positive temperature coefficient thermistor.

11. The battery pack of claim 10 further comprises a circuit board residing in the housing, where the positive temperature coefficient thermistors and the protection circuit are mounted to the circuit board.

12. The battery pack of claim 11 further comprises a switch electrically connected between the protection circuit and one of the plurality of terminals, wherein the protection circuit opens the switch when the voltage across a given cell exceeds the threshold.

13. The battery pack of claim 9 wherein the plurality of battery cells having a lithium-ion chemistry.

14. The battery pack of claim 9 wherein the positive temperature coefficient thermistors having a nominal resistance on the order of ten Ohms.

* * * * *